Patented Apr. 17, 1951

2,549,017

UNITED STATES PATENT OFFICE 2,549,017

COATING COMPOSITIONS CONTAINING GLASS FIBERS

Jacob A. Saffir, Kew Gardens, N. Y., assignor to The Dentists' Supply Company of New York, New York, N. Y., a corporation of New York No Drawing. Application September 22, 1945, Serial No. 618,055

6 Claims. (Cl. 260—38)

This invention relates to the art of coating compositions. More particularly it pertains to compositions, adapted for application to a surface, while in the fluid state. In its preferred embodiments, the invention is directed to such compositions as varnishes, lacquers, paints and the like.

Despite the practicable characteristics of existing paints, lacquers and varnishes, it is generally conceded in the art that substantial improvement is desirable. Thus coating compositions available have not provided requisite characteristics of abrasion and impact resistance, nor have they manifested resistance to weathering and crazing to an extent which should be attainable.

It is an object of this invention to obviate the difficulties and uncertainties hereinabove indicated.

It is another object of the invention to provide a coating composition having substantially reduced crazing tendency and materially enhanced generally wearing properties, weathering characteristics, as well as esthetic value.

An additional object is a varnish, lacquer or paint composition manifesting a significant improvement in abrasion resistance and impact properties.

A further object is to devise appropriate methods in connection with the foregoing compositions.

Other objects, advantages and features of my invention will become apparent from the following description illustrative of its desirable and preferred adaptations.

The prior art practice has generally been predicated upon the concept of utilizing solutions or suspensions of minute particles, such as impalpable powders, to effect a uniformity of coating or film surface. It has been ascertained within the purview of this invention that contrary to expectations, substantially improved characteristics particularly with respect to such properties as abrasion and impact strength, as well as weathering and crazing, may be attained through the expedient of an appropriate inclusion of discrete fibers. Thus, it has been discovered that a substantial concentration of fibers may be added to a varnish, lacquer or paint, for example, for providing a coating which reveals a striking improvement in wear properties and strength as well as enhanced esthetic value.

Advantageous results are obtainable through the use of a substantial assortment of fibers of organic and inorganic derivation, the primary requisite being that they are chemically inert in the coating composition utilized, as well as in the coating or film resulting therefrom. Illustrative of the organic fibers are those fabricated from synthetic resins, exemplified by nylon and the so-called artificial wool fibers, which are of soya bean derivation; so-called glass wool and mica fibers are representative of the inorganic type. The preferred embodiment has been found to be the glass fiber, and particularly that known in the art as "Fiberglas." The preferred characteristics obtainable within the scope of the invention are those having dimensional properties within the preferred range disclosed hereunder, and especially when present in the approximate concentration range indicated.

The utilization of glass fibers permits an optimum control and variation of the ornamental characteristics of the film or coating attained, and also results in maximum improvement in mechanical strength without detriment to the predetermined esthetic properties of the film. By the inclusion of fibers of the approximate concentration and dimension range disclosed herein, an improvement in the impact and abrasion resistance of the coating composition is attainable which has not been heretofore contemplated or considered possible, thereby emphasizing the difference in kind of coating compositions over the prior art. Where the concentration and the dimension of fibers are within the optimum ranges disclosed and are such as to result in their discrete dispersion in the varnish, lacquer or paint, the preferred embodiments of the invention are manifested with respect to uniformity of composition and esthetic control, together with the aforementioned material increase in strentgh.

The fiber dimensions which permit an appropriate discrete dispersion while at the same time affording the desirable strength improvement and esthetic control have been found to be within the approximate diameter range of 0.045 inch to 0.00004 inch, and an approximate length range of 0.01 inch to 0.25 inch. The optimum values for these dimensions are considered to be a diameter in the approximate range of 0.00022 inch to 0.00048 inch and a length in the approximate range of 0.01 inch to 0.2 inch. The preferred embodiment of fiber length is ascertained to be between 1/32 and 1/64 inch, the former being preferable.

As for the range of concentration, while some improvement is attainable with as little as 1% discrete glass fibers dispersed in the composition, as much as 45% of the fibers may be dispersed therein. The high content of fibers may affect the consistency of the composition to the extent that it does not lend itself to a facilitated surface application, as by an easy brushing.

The preferred range of fiber concentration is between approximately 7% to approximately 25%, with the optimum concentration represented by the approximate range of 10% to 17%. A concentration of approximately 10% has provided particularly effective results, but the preferred concentration may be subject to variation within the optimum range, dependent upon the characteristics of the coating composition, the surface to be coated, as well as other conditions which may be encountered. The optimum range has in general manifested characteristics of an especially critical nature, affording excellent strength characteristics and permitting a greater facility in the esthetic control. For example, in the case of wooden flooring covered with a widely used translucent varnish composition within which there has been dispersed a fiber glass concentration from the optimum range, the fiber content has been found to be substantially invisible while the improved strength has revealed itself to be far superior to precisely the same varnish coating without the glass fibers therein.

While the color of the fibers manifests an overall effect on the appearance of the varnish, and may even result in rendering visible fibers present in this concentration range, where the fibers are substantially colorless or of generally light hue, the substantial invisibility of their presence follows.

The coating composition within the purview of the invention may be made from any of the diversified types of materials which are normally utilized in the production of varnishes, lacquers, and paints. It may embrace any natural or synthetic gum or resin dissolved or dispersed in a suitable vehicle, and which resultant composition is adapted to provide a coating or film as a result of the volatilization and/or chemical alteration of the vehicle.

Illustrative of these compositions are spirit varnishes essentially comprising a resin and/or gum and a volatilizable solvent therefor; oil varnishes which may comprise a drying oil, a resin content, drier and thinner or solvent, a lacquer such as a plastic of cellulosic derivation, exemplified by nitrocellulose, and a volatilizable solvent; and paints within the generally recognized significance of the term. It will be understood that this general indication of the characteristics of a varnish, lacquer or paint is not intended to preclude the presence of any perfecting or additive ingredients within the skill of the art.

The resins or gums utilizable in the varnish or paint compositions are of wide diversity pursuant to the usual practice in the art. Among these are rosin, ester gums, alkyd resins, modified alkyd resins such as the oil or resin modified alkyds, phenolic base materials including modified or blended phenol resins exemplified by the oil or resin modified types. Further resin illustrations comprise phenol-furfurals, phenol-formaldehyde, cresole-formaldehyde, amino resins such as urea-formaldehyde, vinyl resins including styrene and the like, methacrylate resins, as well as many others or their mixtures.

A quite remarkable result has been noted to the effect that the properties of a film, irrespective of whether the film results from a varnish, lacquer or paint, is obtained from fibers which are appropriately coated prior to their dispersion in the liquid coating composition. Thus glass fibers having a resinaceous coating thereon, when dispersed in a varnish, lacquer or paint provide a film manifesting a very significant improvement in abrasion and impact strength as well as resistance to crazing and weathering, over that which results from the dispersion of uncoated glass fibers in the same coating composition.

Moreover it has been found that some fiber coating compositions provide superior results to others, indicating that the improved properties may be a function of the type of coating with which the glass fiber is supplied prior to its dispersion. Preferred fiber coatings are those resulting from any natural or synthetic resin, preferably the latter, although improved results have also been shown by fibers bearing a film of wetting agent, such as alkanolamine esters or sulfonated and sulfated amides having the formula $R-CO-NH-(CH_2)_2-OSO_2R'$, where R is an alkyl group of at least $C_6$ and $R'$ is a monovalent cation per se or attached to O.

Among the substances that have been particularly effective as coating materials for the fibers are methyl methacrylate or polymers thereof, phenol-formaldehyde resin, and especially amino resins—that is, resins involving amino reagents in their production and N in their ultimate state, as illustrated by the urea type resins. Similarly, the silicone resins are desirable. A particularly optimum coating which has afforded superior strength characteristics are the super amine type of resinous compounds, including the polyamides resulting from the reaction of a diamine with a dibasic acid, such as disclosed by way of illustration in Carothers Patents No. 2,158,064; No. 2,174,619; and No. 2,163,584. Similarly, optimum results have been obtained with fibers coated with a dimethacrylate resin such as "BCM," a product of E. I. du Pont de Nemours and Co.

Indicative of the improvements resulting from such polyamide or dimethacrylate resin coated glass fibers in a coating composition is the following example. An alkyd-phenol-aldehyde resin, for example V-94 Varnish, produced by the Sherwin-Williams Company was admixed with 10% of glass fibers having an approximate length of $\frac{1}{32}$ inch with a diameter of approximately 0.00022 inch, the fibers being coated with dimethacrylate resin.

Predetermined wooden specimen were coated with this varnish, containing "BCM" coated glass fibers in discrete dispersion, and permitted to dry. To similar wooden specimen the same varnish containing precisely the same dimension and content of uncoated glass fiber was applied under similar conditions for coating. A comparative standard abrasion test of these specimen was carried out on the so-called "Taber-Abrader," with the result that the varnish, containing the "BCM" coated fiber, revealed an abrasion resistance on the average at least 200% greater than the varnish containing the uncoated fibers, and as much as approximately 500% greater.

A similarly impressive improvement in results may be obtained in the foregoing example where the dispersed glass fibers are coated with polyhexamethylene adipamide in lieu of "BCM." It will be noted that the Sherwin-Williams varnish designated is merely illustrative of any commercial varnish or lacquer available, since the features of the invention are predicated upon the general characteristic improvement resulting from the fiber inclusion, preferably where the fibers are appropriately coated as hereinabove disclosed.

Comparatively effective results have been obtained with a varnish prepared in accordance with the following details. A phenol-formaldehyde resin such as Bakelite (No. 254) in the amount of 100 pounds was boiled in 25 gallons of linseed oil until a stringy mass was formed. To this mass was added 100 pounds of hydrogenated naphtha; the mixture was thoroughly stirred and ½% cobalt naphthalate was added as a dryer. Glass fibers coated with polyhexamethylene adipamide, as by spraying the molten polyamide or an emulsion thereof onto the fibers when formed, were dispersed in the varnish in a concentration of approximately 12%, the fibers having a length of approximately $\frac{1}{32}$ inch and a diameter of approximately 0.00025 inch.

The abrasion resistance of the film coating resulting from this composition on the basis of the Taber Abrader represented an improvement of approximately 275% as compared with the same concentration and dimension of uncoated glass fibers, and approximately 400% improvement compared with the varnish film obtained from the same varnish composition which was free from glass fibers.

This improvement might be explained from the standpoint that the coating functions as a dispersing agent, and results in a more complete at random dispersion of the fibers than is possible in the case of the uncoated fibers. Moreover, the "BMC" type or super amine coating may function to convey to the fibers an element of resiliency and added strength which is not otherwise attained, and this strength improvement is in turn transmitted to the resultant lacquer film that is attainable.

There are indications which may be observed by a microscopic observation of the film resulting from a coating composition containing glass fibers, that the fibers dispersed in their vehicle flow into the interstices or crevices of a wooden surface to which they are applied, and when the film dries, these creviced fibers function as the supporting surface which is subjected to wear, such as by abrasion or impact, with the result that the wear characteristics of the film are substantially improved by the reenforcing function of the fibers. The more complete and uniform the fibers are dispersed, the more effective a glass fiber supporting or reenforcing function is provided, and accordingly where the coating material for the glass fiber is such as to provide optimum dispersion in the coating composition, an optimum film is attainable.

Moreover it is possible that the fibers function in the nature of a molecular reenforcement of the materials determining the coating composition. In any event, it is clear that the fiber inclusion in the coating composition is unequivocally differentiated from the category of a filler material, which ordinarily is in a granulated or finely divided state, as evidenced by the difference in the properties attainable. It should be further noted that the present invention, predicated upon the inclusion of an appropriate content of fibers in a liquid coating composition, is entirely distinguishable from and should not be confused with the use of fibers in molding compositions.

It is to be understood with respect to the foregoing consideration however, that there is no intent whatever to be restricted to any particular theory or explanation of the improved results attributable to the coated fiber, the scope of the invention being predicated upon the fact that such increase in strength does arise from the feature of utilizing coated fibers.

The characteristics of the lacquer film are moreover affected by a variation in the type of coating which is supplied to the fibers. Thus a variation in the abrasion and wear resistance of the film will apply in accordance with the variation of the glass fiber coating. Methyl methacrylate, phenolformaldehyde resins, and the urea resins will provide definite characteristics in the resultant film. Moreover, one type of super amine or polyamide coating may show a variation from another type of super amine coating; that is, the extent of improvement may vary with each particular compound applied to the fiber. Nevertheless, any applied coating compatible with the fibers will bring about improved properties in the composition film, compared with the film attainable from the uncoated fibers.

Of additional significance is the discovery that coated glass fibers lend themselves to a higher content of effectively dispersed discrete glass fibers than is attainable with fibers free from coating. Moreover a more uniform, smooth film is attainable under these conditions. As the fiber concentration is increased, the effectiveness of the dispersion appears to depend upon the characteristics of the coating of the glass fibers. Without intending to be restricted to any particular theory, it is believed that the amino resin coatings manifest characteristics similar to that of a particularly effective wetting agent, enabling the inclusion of a higher percentage of discrete glass fibers in effective dispersion than is attainable with other types of coatings. The super amine resins, such as the polyamides, and other types such as the acrylics or the acrylates, permit an effective dispersion of discrete fibers in a varnish composition to the extent of approximately 45%. Such an increase in fiber content materially strengthens the film, and where the fibers have an index of refraction comparable with that of the varnish, the transparency or translucency may be little affected. However the consistency of the coating composition containing this content of fibers is such as to render a simple application by brush to a given surface impracticable, and from this standpoint the maximum expedient concentration has been found to be 25% as previously indicated.

It will be understood that the decorative or esthetic effects attainable by the inclusion of glass fibers are subject to substantial variation. The inclusion of an excess of fibers over that which can be expediently dispersed therein will result in an attendant opacity. Moreover, where a mottled effect is desired, the inclusion in the coating composition of comparatively long fibers, but not in a proportion substantially in excess of that which may be appropriately dispersed therein, will afford an agglomeration or clumping of fibers into clusters. The over-all appearance attainable in this manner is that of a rough finished or irregular coating. Other expedients for affecting the appearance will depend upon the coloration of the fibers, which may be attained during the course of their formation or by the color of the coating applied thereto. The index of refraction of the fibers is similarly relevant to the ultimate appearance of the film, and where the index of refraction corresponds with that of the coating composition, the fibers will be invisible.

The varnish, lacquer or paint may be applied in any expedient manner. It has been noted in connection with the invention that where colorless glass fibers of optimum range of concentration and dimension are dispersed in a varnish or lacquer which is essentially colorless or transparent, the glass fibers will be substantially invisible in the resultant film. Even where the fibers can be seen on close scrutiny, in the attendant general effect, they are essentially unnoticeable in view of their uniform dispersion and dimensions. On applying such a varnish or lacquer, etc., to a wood surface, such as a flooring, it is expedient to first supply one or several successive coats, allowing for intermediate drying intervals. Should any irregularities in the appearance of the film persist, after one or more of such glass-film coatings, the supplementary application of one or more coats of the varnish or lacquer or the like, free from any fiber content, will serve to normalize and render uniform the outward appearance. This supplementary fiberless coating not only serves to complement the previously applied fiber containing film, but it also seems to function as if it similarly contained fibers. In effect, the fiber coating, and the net result of the cumulative films is that of a uniform film with fibers dispersed throughout the same, pursuant to the characteristics of the first applied fiber containing coating composition.

Accordingly the purport of this invention embraces novel coating compositions manifesting such a significant improvement in wearing characteristics—evidenced by a very substantial increase in abrasion and impact resistance, along with material reduction in crazing tendency, as well as enhanced covering and esthetic properties—as to emphasize the difference in kind of the coating compositions disclosed herein over the prior art lacquers, varnishes, paints or the like. Distinctly superior covering qualities are provided, particularly where the fibers are supplied within an optimum concentration and dimension range. The preferred embodiment contemplates the coating of the fibers with a natural or synthetic resin, and desirably with a resinaceous material of amino derivation, such as that attainable from polyamides. The coating film obtained from the use of such fibers in optimum concentration and dimension is more homogeneous than that otherwise attainable, and affords maximum improvement, in mechanical strength, especially evidenced by the enhanced wearing characteristics, such as that of impact and abrasion resistance. Accordingly, the invention is predicated upon a significant utilitarian as well as esthetic advance in the art.

While I have described my invention in accordance with desirable embodiments and procedural details, it is obvious that many changes and modifications may be made in the features and characteristics of the compositions involved without departing from the spirit of the invention as defined in the following claims.

Having thus set forth my invention, I claim:

1. A varnish comprising a phenol-formaldehyde resin in a volatile solvent and containing glass fibers dispersed therein in the approximate concentration range of 10% to 17%, said fibers being coated with polyhexamethylene adipamide, said fibers having a diameter in the approximate range of 0.00022 inch to 0.00048 inch, and a length in the approximate range of $\frac{1}{32}$ inch to $1/64$ inch.

2. A varnish comprising a phenol-aldehyde condensation product and containing glass fibers dispersed therein in an approximate concentration range of 7 to 25%, said fibers being coated with a synthetic N-containing condensation resin and having a fiber length in the approximate range of 0.01 to 0.25 inch.

3. A varnish comprising a phenol-aldehyde condensation product and containing glass fibers dispersed therein in an approximate concentration range of 7 to 25%, said fibers being coated with a polyamide resin.

4. A varnish comprising a phenol-aldehyde condensation product and containing glass fibers dispersed therein in an approximate concentration range of 7 to 25%, said fibers being coated with polyhexamethylene adipamide.

5. A varnish comprising a phenol-aldehyde condensation product and containing glass fibers dispersed therein in an approximate concentration range of 7 to 25%, said fibers being coated with a polyamide resin resulting from the reaction of a diamine with a dibasic acid.

6. A varnish comprising a phenol-formaldehyde condensation product and containing glass fibers dispersed therein in an approximate concentration range of 7 to 25%, said fibers being coated with a polyamide resin.

JACOB A. SAFFIR.

REFERENCES CITED

The following references are of record in the file of this patent:

UNITED STATES PATENTS

| Number | Name | Date |
| --- | --- | --- |
| 1,997,924 | Curtis | Apr. 16, 1935 |
| 2,176,837 | Ellis | Oct. 17, 1939 |
| 2,196,033 | Schuhmann | Apr. 2, 1940 |
| 2,354,110 | Ford et al. | July 18, 1944 |
| 2,403,872 | Miller | July 9, 1946 |
| 2,451,126 | Stringfield et al. | Oct. 12, 1948 |